O. A. FREEMAN.
ROTARY VEGETABLE SLICER.
APPLICATION FILED JULY 31, 1918.
1,341,894.
Patented June 1, 1920.
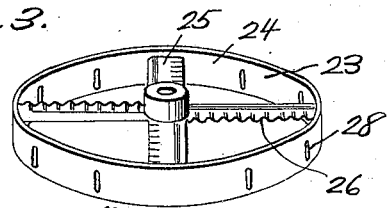
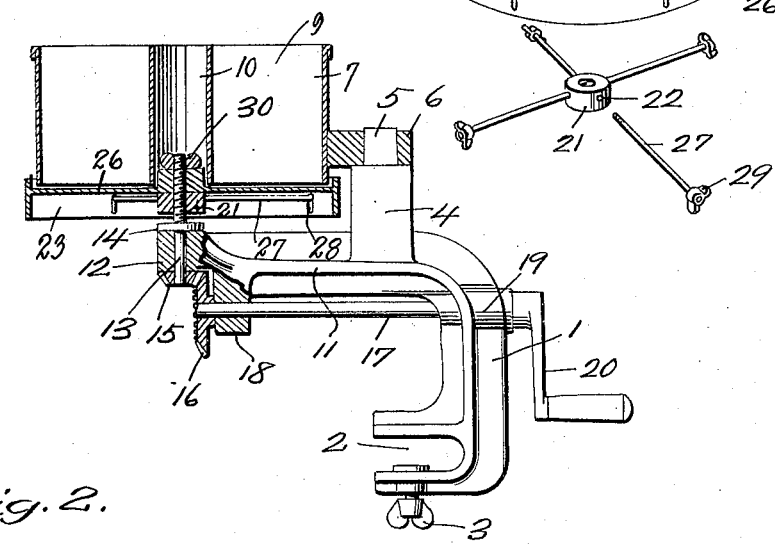
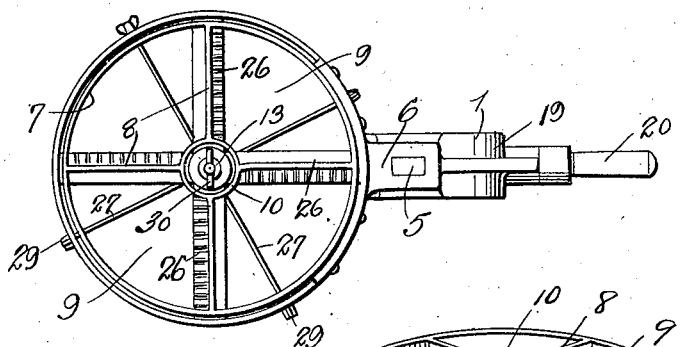
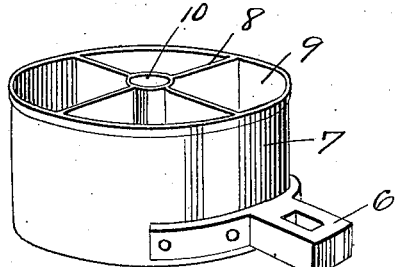
WITNESSES
INVENTOR
Ogden A. Freeman,
BY
ATTORNEY

UNITED STATES PATENT OFFICE.

OGDEN A. FREEMAN, OF ROCKWOOD, COLORADO.

ROTARY VEGETABLE-SLICER.

1,341,894.  Specification of Letters Patent.  Patented June 1, 1920.

Application filed July 31, 1918. Serial No. 247,612.

*To all whom it may concern:*

Be it known that I, OGDEN A. FREEMAN, a citizen of the United States, residing at Rockwood, in the county of La Plata and State of Colorado, have invented certain new and useful Improvements in Rotary Vegetable-Slicers, of which the following is a specification.

This invention relates to slicing devices and more particularly to a rotary vegetable slicer particularly adapted for receiving vegetables and rotatably moving them into contact with cutting elements whereby slices may be readily cut from the vegetables while the device is in operation.

A further object of the invention is to provide a device that may be readily mounted upon a table or bench and that may be operated by hand so that danger of cutting the fingers will be entirely obviated.

The invention also aims to provide a device of this character that will be especially adapted for shredding or slicing various kinds of vegetables by simply changing the direction of rotation of the vegetable container so that the vegetable will be brought into contact with different edges of the cutting blade.

A further object of the invention is the provision of a device of this character which consists of comparatively few parts and is simple in construction but durable and well adapted to withstand the rough usage to which devices of this character are ordinarily subjected.

For a full description of the invention and the advantages and merits thereof, reference is to be had to the following description and the accompanying drawings wherein is illustrated the preferred form of my invention, in which:—

Figure 1 is a side elevation partly in section disclosing the invention ready for use.

Fig. 2 is a top plan.

Fig. 3 is a detail fragmentary perspective view of the cutting element and the fastening devices for the same.

Fig. 4 is a perspective view of the vegetable container.

Referring to the drawing wherein is illustrated the preferred form of my invention, in which like numerals of reference indicate corresponding parts throughout the several views, a bracket 1 is provided with a yoke portion 2 whereby the bracket may be securely attached to a table or support, the yoke having a thumb screw 3 which may be manipulated to clamp the bracket to the table. Extending vertically from the bracket is a stud 4 having a pin 5 at its terminal and this pin receives the supporting arm 6 which carries a vegetable container 7 of cylindrical formation and having its interior provided with a plurality of partitions 8 for separating the interior of the container into a plurality of compartments 9. Centrally arranged in the container is a cylindrical sleeve 10 and the partitions 8 radiate from the exterior of the sleeve to the inner wall of the container. This container has no bottom and the vegetables are held therein in a manner that will presently appear.

The right angularly projecting arm 11 of the bracket is provided at its end with a bearing 12 carrying a pintle 13 the upper end of which is screw threaded. This pintle is provided with a flange 14 resting upon the bearing 12 to maintain the pintle in raised position.

Below the bearing 12, and fastened to the extended end of the pintle 13 is a beveled pinion 15 in mesh with a beveled gear 16 carried by an operating shaft 17 the forward end of which is journaled in a projection 18 carried by the arm 11, of the bracket. The opposite end of the shaft 17 is journaled in an enlarged portion 19 in the bracket and is provided at its outer terminal with a crank 20 by which the shaft may be manually operated for rotating the gears to impart the turning movement to the pintle 13. Screw threadedly mounted upon the pintle is a collar 21 shown in detail in Fig. 3 of the drawing and this collar, as shown, is provided at diametrically opposite points with four screw threaded openings 22. The cutting element 23 consists of an annular band 24 and a central collar 25 adapted to fit freely over the extended upper end of the pintle 13. Radiating from the collar 25 are the four cutting blades or knives 26 which have double edges. One edge, is straight and flat and is used for slicing straight slices from the vegetables while the opposite edge is crimped or corrugated for causing shredded slices to be cut from the vegetable when the device is in operation.

The collar 25 and the disk 22 are moved into engagement as shown in Fig. 1 when the parts are assembled in position and in order that the knife element will rotate, I have provided the connecting rods 27 which have their inner ends screw threaded to be received in the screw threaded openings 22 while their outer ends are adapted to project through the slot 28 in the annular band 24 and be held thereto by the thumb nut 29 which are carried by the outer end of the rod and which are rigidly fixed to the same. Thus, when the rods are extended through the slots 28 and engage with the screw threaded openings, the thumb nut 29 may be manipulated for tightly securing the annular band in position whereby a rotary movement of the cutting element will occur when the pintle is turned. The upper end of the pintle receives a thumb screw 30 for retaining the collar 25 in tight engagement with the disk 22.

When the vegetable container is mounted in position as shown in Fig. 1 the open bottom thereof is disposed in a plane slightly above the plane through which the cutting blades move when the band is rotated, and, since the container is stationary it will be obvious that the vegetable within the different compartments will engage with the knives as the latter are rotated and, consequently slices will be readily cut from the vegetable.

From the foregoing it will be obvious that a very simple and durable vegetable cutter has been provided the details of which embody the preferred form. I desire it to be understood however, that slight changes in the minor details of construction may be made without departing from the spirit of the invention or the scope of the claims hereunto appended.

Claims:

1. A rotary vegetable cutter comprising a rotatable support, a cutting element comprising an annular band and a central hub mounted on the said rotatable support, a plurality of double edged blades extending from the hub to the said band and disposed to lie in a horizontal plane, removable rods releasably connected with the band and with the said rotatable support to maintain the band in position for holding the said knives rigidly, and means to actuate the said rotary support.

2. The combination of a support having a container means mounted thereon and provided with an open lower end, a cutting element disposed beneath said open end and in close proximity thereto, said element comprising a perforated rim and a plurality of blades radiating from a common center and embraced by said rim, a rotatable collar carried by said support and adapted to underlie the center of said radiating blades and separable fastening pins insertible through the perforations of said rim and adapted to be secured to said rotatable collar for connecting the radiating blades thereto.

3. The combination with a common support of a tubular container having an open lower end and a central tubular hub portion, a cutting element disposed adjacent the said lower end of the container and comprising a plurality of flat horizontal radiating knives having their outer extremities embraced by an annular flange adapted to encircle the lower peripheral edge of said container and being further provided with an offset hub portion adapted to be received into the tubular hub of the container, the said flange being suitably perforated below the radiating knives, a revolving shaft carried by said support and extending up through the hub portion of said cutting element, means for rotating said shaft and fastening elements supported in the perforated portions of the said flange and adapted to be brought into binding engagement with said shaft, whereby said cutting element may be caused to revolve therewith.

4. A rotary vegetable cutter comprising a substantially right angled bracket, an extension formed on one of the angular bracket portions, a bottomless vegetable container removably attached to said projection and extending above the bracket portion integral with said projection and provided with a tubular hub portion, a pintle shaft revolubly supported through the said angular bracket portion, a plurality of revolving cutting elements centered to move freely upon the pintle and in close proximity to the hopper, said cutting element movable in a horizontal plane across the open container bottom and extending beyond the same on all sides, an annular rim secured to the outer extremities of said cutting element and embracing the lower edge of said container, means carried by said rim for binding engagement with said pintle shaft below said cutting element for locking the said element thereto and means carried by the other angular bracket portion for transmitting motion to said pintle shaft and the said cutting element carried thereby.

In testimony whereof I affix my signature in presence of two witnesses.

OGDEN A. FREEMAN.

Witnesses:
W. B. CLARK,
J. F. FAHRION.